United States Patent [19]

Campanini

[11] 4,231,286
[45] Nov. 4, 1980

[54] BRAKE ACTUATORS
[75] Inventor: Sergio Campanini, Iola, Kans.
[73] Assignee: The Echlin Manufacturing Company, Branford, Conn.
[21] Appl. No.: 48,067
[22] Filed: Jun. 13, 1979
[51] Int. Cl.³ .............................................. F01B 7/00
[52] U.S. Cl. .................................................... 92/64
[58] Field of Search ................................. 91/170–178, 91/440; 92/62, 63, 64; 303/2, 9, 13

[56]  References Cited
U.S. PATENT DOCUMENTS

| | | | |
|---|---|---|---|
| 3,131,609 | 5/1964 | Dobrikin et al. | 92/63 |
| 3,151,525 | 10/1964 | Dobrikin et al. | 92/24 |
| 3,182,566 | 5/1965 | Berg et al. | 92/24 |
| 3,255,676 | 6/1965 | Berg et al. | 92/29 |
| 3,264,951 | 8/1966 | Dobrikin | 92/64 |
| 3,302,530 | 2/1967 | Dobrikin et al. | 91/440 |
| 3,476,019 | 11/1969 | Berg et al. | 91/420 |
| 3,502,003 | 3/1970 | Dobrikin et al. | 92/63 |
| 3,581,627 | 6/1971 | Campanini | 92/63 |
| 3,636,822 | 1/1972 | Horowitz | 92/63 |
| 3,696,711 | 10/1972 | Berg et al. | 92/63 X |
| 3,713,702 | 1/1973 | Campanini | 92/64 X |
| 3,719,125 | 3/1973 | Cannella | 92/63 X |
| 3,908,520 | 9/1975 | Ma | 92/64 X |
| 4,031,814 | 6/1977 | Lukens et al. | 92/63 |

Primary Examiner—Leonard D. Christian
Attorney, Agent, or Firm—Neuman, Williams, Anderson & Olson

[57] ABSTRACT

Brake actuators are provided which use pistons for both auxiliary and service functions, the auxiliary piston being operative to compress a spring in response to fluid source pressure and the service piston being operative to develop throughout its movement a brake operating force which is uniformly proportionate to service fluid pressure. Two cup-shaped housing members have rim portions secured together. One of such cup-shaped members and a metal sleeve define cylindrical surfaces for co-action with the pistons, the metal sleeve being disposed within a resilient sleeve which is disposed at least partly within the other of the cup-shaped members. The service piston is located in front of the auxiliary piston and coacts with the cylindrical surface of the metal sleeve. A resilient boot is disposed between the service piston and a forward end wall, around an actuating rod having a rearward end in engagement with the service piston.

22 Claims, 4 Drawing Figures

BRAKE ACTUATORS

This invention relates to brake actuators and more particularly to brake actuators which are compact and simple in construction while being capable of applying required maximum forces to braking mechanisms, to insure safety. The actuators have uniform response characteristics and are rugged, reliable and economically manufacturable.

BACKGROUND OF THE INVENTION

In trucks and similar vehicles, a source of a pressurized fluid such as compressed air is generally provided and actuators are used which include both a service portion and an auxiliary portion. The service portion is used for the normal application of the brakes in response to a service pressure of variable magnitude developed from the source pressure through an operator-controlled valve. The auxiliary portion is operative in emergency or other conditions in which the source of fluid pressure fails or is otherwise removed. Generally, it includes a powerful spring which is held in a compressed energy storing condition by source pressure, being released to apply the brakes.

Various constructions for such actuators are disclosed in U.S. Pat. Nos. 2,809,723; 3,117,496; 3,131,609; 3,182,566; 3,302,530; 3,331,291; 3,502,003; 3,581,627; 3,636,822; and 3,908,520.

In such constructions, the service portion includes a diaphragm having an annular flexible portion between the inside of a housing and the periphery of an actuating member which is connected to the rearward end of a rod. The forward end of the rod is connected to a control element of a brake assembly and when service pressure is applied against the rearward side of the actuating member and the diaphragm, the rod drives the control element forwardly to engage brake elements with a drum or disc and to apply a braking force to the vehicle. In one type of actuator the auxiliary portion includes a diaphragm and actuating member similar to those in the service portion. In another type, the auxiliary portion includes a piston having peripheral bearing and seal means in slidable engagement with a cylindrical internal housing surface. Both types have been used with generally satisfactory results.

SUMMARY OF THE INVENTION

This invention was evolved with the general object of providing improved brake actuators for the aforementioned type of braking systems, such as used in trucks and similar vehicles.

The invention is based in part upon the recognition of certain problems with prior types of actuators. One problem is that as the applied service pressure is increased, the reaction or sensitivity to changes therein is reduced and as the service pressure approaches a maximum value, a large increase is required to produce a relatively small increase in the output force applied to the braking assembly control elements. Such non-uniformity in sensitivity is undesirable, especially in the operation of highway type vehicles in which accurate control is very important. In some cases, the maximum obtainable output force is less than what might be applied to the brake assembly control element to apply maximum braking force to the vehicle and adequate performance will not be realized from a safety standpoint.

It has been found that the reason for such deficiencies is that the diaphragm of the service portion of an actuator flexes in a manner such as to produce a nonlinear relationship between applied service pressure and output actuating force. At relatively low service pressures, the area which is effective to produce forward movement is large and the ratio between an incremental change in the output force and a corresponding incremental change in the applied pressure is therefore large. However, as the actuating member is moved forwardly in response to increasing service pressure, the flexible annular portion of the diaphragm extends forwardly and exerts a rearward component of force on the actuating member, the result being a reduction in the net forward applied force. As the limit of movement is approached, part of the flexing portion of the diaphragm may engage the wall of the housing especially when the wall is tapered, as is usually the case. Thus, the net forward applied force may be further reduced.

It has been additionally found that such deficiencies can be obviated by simply using a piston as the actuating member in the service portion, coupled through force-transmitting means to the rearward end of a rod which is connectable at its forward end to a brake assembly control element. With a piston and with suitable peripheral bearing and seal means in slidable engagement with a cylindrical internal surface of a housing, the rearward face of the piston presents area for exposure to service pressure which is constant. As a result, the force applied to the brake assembly increases in linear proportion to the applied service pressure throughout the full range of movement of the control element. Thus, a uniform sensitivity is obtained and, in addition, there is no fading action such as obtained when a diaphragm is used. The maximum braking force which is required in any given application can be obtained with an actuator of smaller overall size.

In accordance with this invention, actuators are provided in which pistons are used in service portions thereof and in which, in addition, constructions are provided using parts which are readily and economically formed and assembled while being rugged and reliable.

In accordance with specific features of the invention, a first piston is used in a service portion of an actuator, a second piston is used in an auxiliary portion of the actuator and separate housing members are provided to define separate internal cylindrical surfaces for coaction with peripheral bearing and seal means of the two pistons. Preferably, one of such members is in the form of a cup-shaped member and the other is in the form of a metal sleeve with another cup-shaped member provided around at least a portion of the sleeve, rim portions of the two cup-shaped members being secured together. A sleeve of elastomeric material surrounds the metal sleeve and may preferably have an annular rib portion engaged between such rim portions.

With these features, actuators are provided which are strong and reliable while being economically manufacturable. The metal sleeve can be readily and accurately formed and the cup-shaped member can be readily formed, it being noted that its side wall may be tapered so that it can be readily formed as a stamping. The use of the resilient sleeve facilitates assembly and in addition, it functions to absorb shocks and vibrations as well as to provide a seal.

Additional important features relate to the positioning of the sleeve and the service piston in a forward portion of the actuator and to the provision of a resilient boot between the service piston and a forward end wall, around an actuating rod projecting forwardly from the service piston and through an opening in the forward end wall. The provisions of the boot and other features facilitate obtaining of the proper seals and protective against entry of moisture and dust which might interfere with proper action and/or increase wear of slidably interengaged surfaces.

This invention contemplates other objects, features and advantages which will become more fully apparent from the following detailed description taken in conjunction with the accompanying drawings.

DESCRIPTION OF PREFERRED EMBODIMENTS

Figure 1:
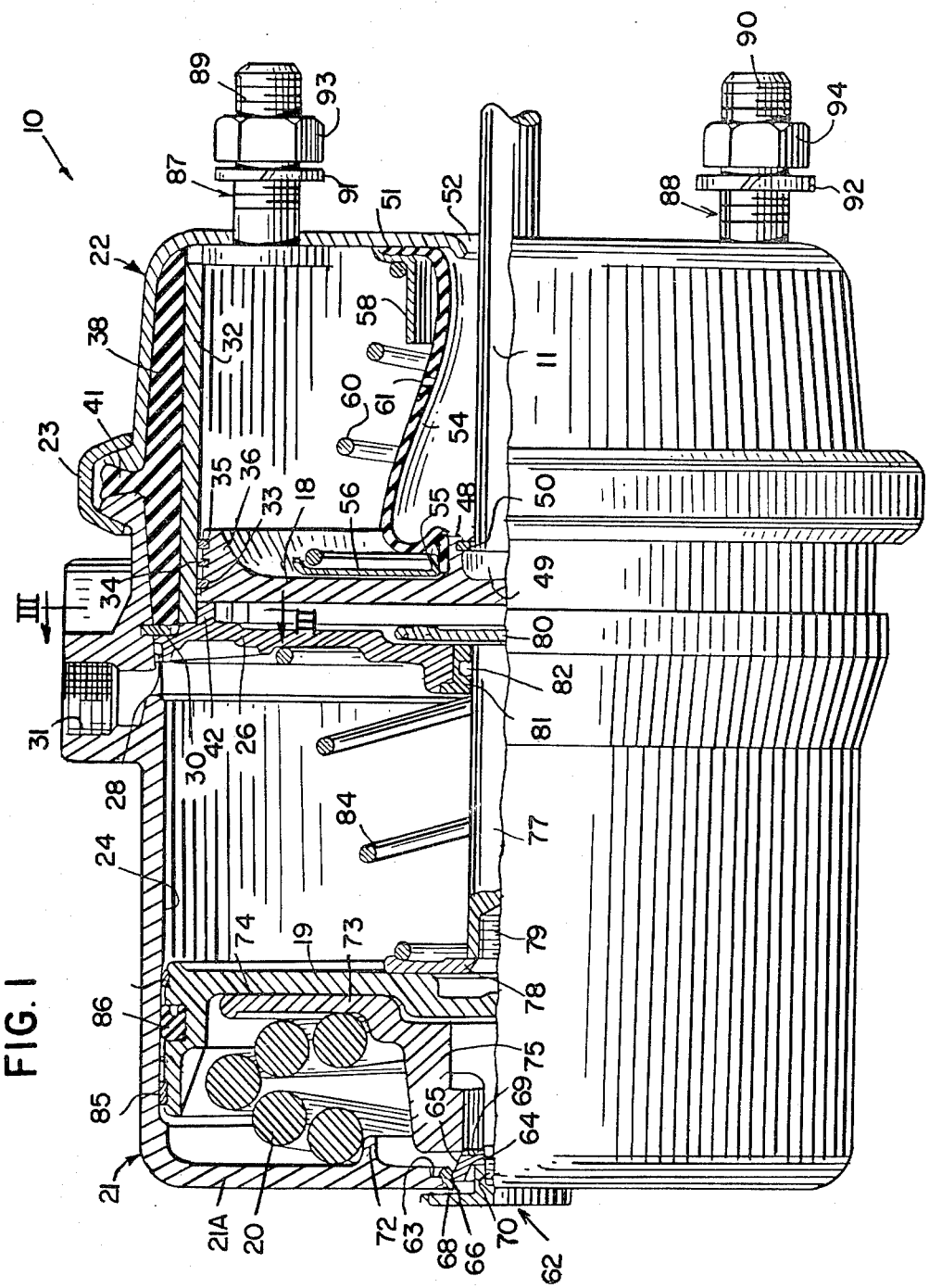
FIG. 1 is a side elevational view, partly in section, illustrating a brake actuator constructed in accordance with the invention.
Figure 2:
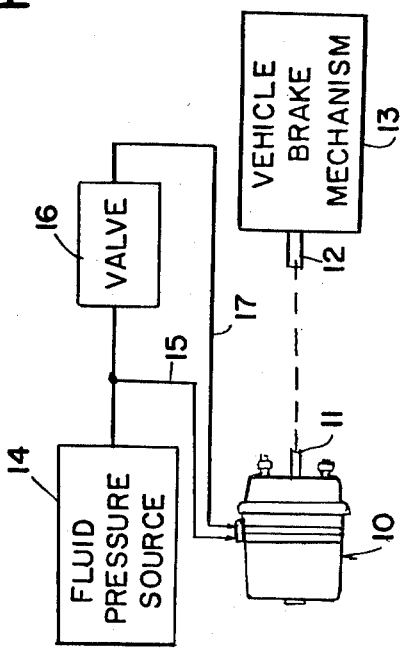
FIG. 2 diagrammatically illustrates a braking system in which the actuator of FIG. 1 is installed.

Reference numeral 10 generally designates a brake actuator constructed in accordance with the principles of this invention and designed for use in a vehicle braking system such as diagrammatically illustrated in FIG. 2. The actuator 10 includes a rod 11 which is coupled to a control element 12 of a braking mechanism 13, the rod being movable longitudinally in a forward direction (to the right as viewed in FIGS. 1 and 2) to move the element 12 away from an inactive position and in a direction to apply an increasing braking force to the vehicle.

The illustrated vehicle braking system further includes a fluid pressure source 14 coupled directly to a first inlet of the actuator 10 through a line 15 and coupled to a second inlet of the actuator 10 through a valve 16 and a line 17. The valve 16 is controllable by the operator of the vehicle to apply a variable service pressure to the actuator 10. In response, a piston 18 within a forward service portion of the actuator 10 operates to move the rod 11 and thereby the element 12 to the right to cause the mechanism 13 to apply a corresponding braking force to the vehicle. The source pressure applied through line 15 is effective to move an auxiliary piston 19 rearwardly and to compress a heavy coiled spring 20 of a rearward auxiliary portion of the actuator 10. When source pressure is removed from the forward face of auxiliary piston 19 for any reason, the spring 20 is allowed to expand to move the rod 11 to the right to apply a large braking force to the vehicle.

The actuator 10 includes a housing defined by a rearward housing section 21 which has a generally cup-shaped configuration and a forward housing section 22 which has a shallower cup-shaped configuration, sections 21 and 22 being secured together by a clamp ring 23. The rearward housing section 21 provides a rearward end wall 21A engaged by the spring 20 and has a side wall defining an internal cylindrical surface 24 for coaction with peripheral bearing and seal means on the auxiliary piston 19 as hereinafter described. The rearward housing section 21 also supports a partition wall member 26 adjacent the forward end of the surface 24, a seal ring 28 being disposed between a forwardly facing annular shoulder of section 21 and a peripheral edge portion of the wall member 28, and a retainer ring 30 being provided in engagement with the forward face of the peripheral edge portion of wall member 26.

Source pressure is supplied through line 15 (FIG. 2) and through a port 31 into the space between the rearward surface of partition wall member 26 and the forward surface of auxiliary piston 19 for moving the auxiliary piston 19 to a position, as illustrated, in which the spring 20 is compressed to a maximum extent. Service pressure is supplied through the control valve 16 and the line 17 (FIG. 2), and through a port and opening, as hereinafter described, into the space between the forward surface of partition wall member 26 and the rearward face of the service piston 18 for moving the service piston 18 forwardly and to move the rod 11 forwardly to operate the braking mechanism 13.

The use of a piston such as the piston 18 in the service portion of the actuator has important advantages over the use of a diaphragm arrangement, as aforementioned. Specific features of the invention relate to the manner in which housing and other components of the actuator are constructed for coaction with the piston 18 to obtain such advantages while minimizing the cost of construction of the actuator and obtaining other advantages. In the illustrated construction, a cylindrical sleeve 32 is provided which defines a cylindrical inner surface for coaction with bearing and seal rings 33, 34, and 35 on a peripheral portion 36 of the service piston 18. The metal sleeve 32 is supported within a resilient sleeve 38 of rubber or other elastomeric material which is preferably located partly within a side wall portion 39 of the cup-shaped forward housing section 22 and partly within a forward side wall portion 40 of the cup-shaped rearward housing section 21. As illustrated, the resilient sleeve 38 may have an integral annular rib portion 41 in its outer surface which is squeezed between rim portions of the forward and rearward housing sections when such are secured together by the clamp ring 23, thereby providing a seal.

Figure 3:
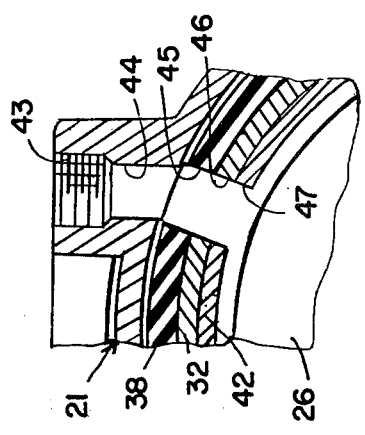
FIG. 3 is a sectional view taken substantially alonger lines III—III of FIG. 1.

To position the metal sleeve 32 relative to the partition wall member 26 and to limit rearward movement of the service piston 18, the wall member 26 has a forwardly-projecting annular rib portion 42 on the inside of the metal sleeve 32 and engageable by the service piston 18. In the illustrated rearward position of the service piston 18, in which it is engaged with the rib portion 42, the forward surface of the partition wall member 26 which is on the inside of rib portion 42 is spaced from the rearward surface of piston 18, thereby providing a space into which service fluid may be admitted. In the illustrated construction, service fluid is supplied into the space so provided through the line 17 (FIG. 2) and through openings shown in FIG. 3, including a port 43, a passage 44, a slot 45 in the resilient sleeve 38, a slot 46 in the metal sleeve 32, and a slot 47 in the rib 42.

To couple the service piston 18 and the rod 11, the piston 18 is formed with a central annular forwardly-projecting portion 48 defining a socket which receives an enlarged head portion 49 on the rearward end of the rod 11, a retaining ring 50 being disposed in a groove near the open end of the socket to lock the head portion 49 in the socket. Preferably, there may be a small spacing between the ring 50 and the opposed surface portion of the head portion 49 to allow the rod 11 to rock or tilt without tilting the piston 18 so as to accommodate misalignments between the control axis of the actuator and the path of movement of the brake mechanism control element 12 without producing a binding action on the piston. It is noted that the forward housing member 22 has a forward end wall 51 formed with a central opening 52 having a diameter somewhat larger than that of the rod 11.

To inhibit the entry of particles and droplets of dust and liquids through the central opening 52 and into the space within the sleeve 32, a boot 54 of rubber or other elastomeric material is provided between the central portion 48 of piston 18 and the rear surface of the forward wall portion 51 around the opening 52. An annular rearward end portion of boot 54 is clamped between the outside of the projecting portion 48 of piston 18 and a forwardly projecting annular flange portion 55 of a plate member 56 engaged with the forward surface of piston 18. A forward end portion of boot 54 is clamped between an outwardly projecting flange portion of a tubular member 58 and the rearward surface of the wall portion 51 about the opening 52. The plate member 56 and the tubular member 58 are engaged by the opposite ends of a coiled compression spring 60 which holds members 56 and 58 in position and also exerts a relatively light rearward force on the service piston 18 when service pressure is removed. It is noted that the spring 60 is centered in the housing and aids in inhibiting tilting of the service piston, the rearward end convolution thereof being engaged within a forwardly turned annular edge portion of the plate member 56 and the forward end convolution thereof being engaged around the tubular portion of member 58.

Preferably, one or more small port openings are provided in the boot 54 for flow of air out from and into the space within the forward portion of the housing in response to forward and rearward movements of the service piston 18, one such port opening 61 being shown in the drawing.

A check valve assembly 62 is provided in an opening 63 in the rear end wall 23 for controlling flow of air into and out of the chamber in which the powerful spring 20 is located, behind piston 19. The assembly 62 includes a member 64 of resilient material which includes a frusto-conical wall portion 65 having a terminal edge engageable with the inner surface of a tubular portion 66 of a member 67. The portion 65 is deflectable radially rearwardly in response to pressure with the spring chamber which is higher than atmospheric pressures, to allow out-flow of air between the edge of portion 65 and the inner surface of the tubular portion 66 and thence through openings 68 in the tubular portion 66. A central portion of member 64 is secured by a washer 69 and a screw 70 to a central forwardly projecting post portion of member 67. The tubular portion 66 is formed with a beveled forward edge and with a rearwardly facing annular shoulder for mounting in the opening 63 with a snap action.

To engage and center the spring 20, the rear wall 23 is formed with an annular rib 72 on its forward face which engages within the rear end convolution of the spring 20. The forward end convolution of the spring 20 engages a flange portion 73 of a member 74 which is engaged with the rear surface of the auxiliary piston 19, the member 74 including a hub portion 75 extending rearwardly within the spring 19.

To transmit force from the spring 19 to the rod 11 when the source pressure is removed from the chamber in front of the auxiliary piston, a shaft 77 is provided with a plate 78 being secured to its rearward end by a screw 79 and being engaged with the front surface of piston 19 and with another plate 80 being secured to the forward end of the shaft 77 and being engageable with the rear face of the service piston 18. The shaft 77 extends through a collar 81 within a central opening in the partition wall member 26, a suitable O-ring seal member 82 being disposed within the collar 81.

To hold the shaft 77 and elements connected thereto in a rearward retracted position when the auxiliary piston 19 is moved to the illustrated position, a coiled compression spring 84 is provided having a forward end convolution engaged with the rear surface of the partition wall member 26 and having a rearward end convolution engaged with the plate 78 within a peripheral lip thereof.

A bearing ring 85 and a seal ring 86 are disposed in grooves in the outer surface of a rearwardly projecting annular peripheral portion of the piston 19, rings 85 and 86 being in engagement with the internal cylindrical surface 24 of the rear housing section 21.

In the actuator 10 shown in FIG. 1, the actuator may be mounted on a suitable support structure of a vehicle by means of a pair of bolts 87 and 88 which have threaded shank portions 89 and 90 extending forwardly through the front wall 51 for extending through openings of a support member on the vehicle and receiving washers 91 and 92 and nuts 93 and 94.

Figure 4:
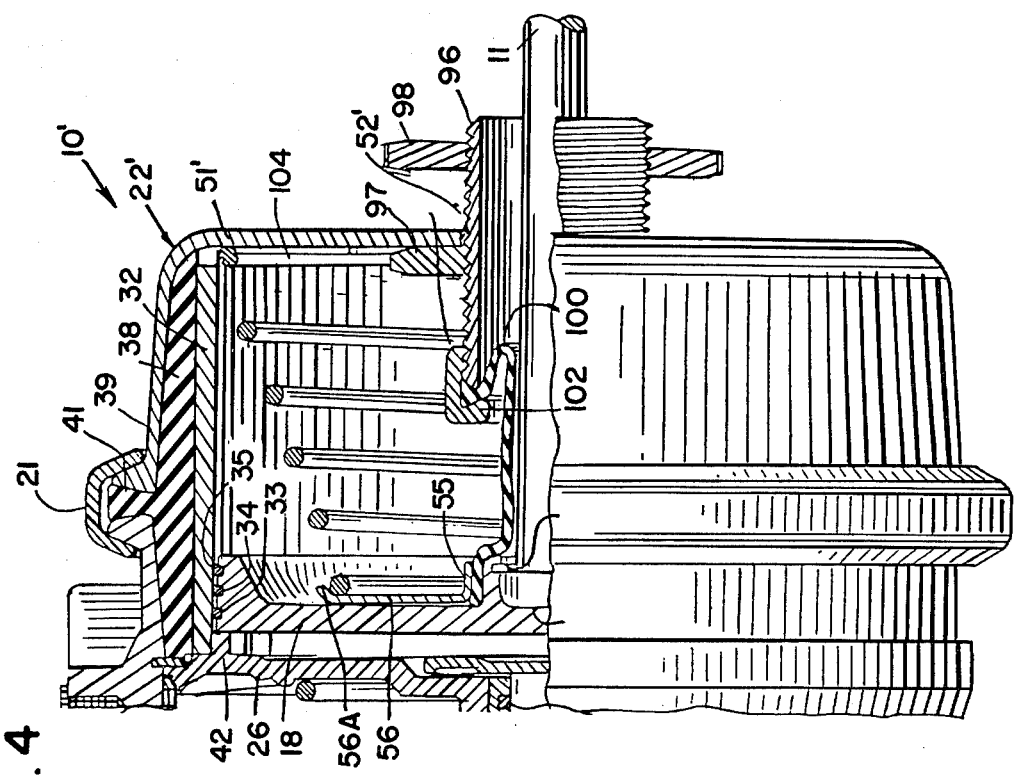
FIG. 4 is a side elevational view, party in section and similar to FIG. 1, illustrating a modified actuator.

FIG. 4 shows a modified actuator generally designated by reference numeral 10' which has a construction like the actuator 10 but which has a modified forward housing section 22' including a front wall 51' having a central opening 52' which receives an externally threaded sleeve 96 with a nut 97 thereon on the rearward side of the front wall 51', inside the housing. The sleeve 96 may extend forwardly through an opening of a support member on the vehicle and a second nut 98 may be threaded thereon to secure the actuator 10' to the vehicle.

The sleeve 96 is in surrounding relation to the rod 10 and its inside diameter is larger than that of the rod 10 to permit relative tilting or rocking movement of the rod 10.

In the modified actuator 10', a boot 100 is provided which is similar to the boot 54 and which also is of flexible elastomeric material with a rearward end portion thereof being clamped between the outside of the projecting portion 48 of piston 18 and the forwardly projecting annular flange portion 55 of the plate member 56. The forward end portion of the boot 100 is folded back with a terminal bead portion thereof being clamped between the rearward edge of sleeve 96 and an inwardly turned flange portion of a ring 102 threaded on the rearward end of sleeve 96.

The modified actuator 10' also includes, in place of the spring 60, a coiled compression spring 104 which differs from spring 60 in that it increases in diameter from a rearward end convolution engaged with plate 56 on the inside of its forwardly turned peripheral edge to a forward end convolution engaged with the front end wall 51' adjacent the forward end of the sleeve 32.

It will be understood tht modifications and variations may be effected without departing from the spirit and scope of the novel concepts of this invention.

What is claimed is:

1. In an actuator for use in a vehicle having a braking system including a fluid pressure source, valve means coupled to said source for developing a service pressure of variable magnitude and a brake assembly having a control element movable through a certain distance between a rearward inactive position and a forward limit position at which maximum braking force is applied to the vehicle, said actuator comprising housing means defining a rearward end wall, an intermediate partition wall and a forward end wall and rearward and forward coaxial internal cylindrical surfaces around rearward and forward spaces between said rearward and forward end walls and said partition wall, auxiliary and service pistons in said spaces on opposite sides of said partition wall, peripheral seal means on said pistons in slidable engagement with said internal cylindrical surfaces, an elongated rod for extending forwardly from said housing along the axis of said cylindrical surfaces and to a forward end connectable to said control element, first force transmitting means between said auxiliary piston and said rod, second force transmitting means between said service piston and said rod, a coiled compression spring having a forward end engaged with the rearward side of said auxiliary piston, means for admitting fluid under source pressure into said housing to act against the forward side of said auxiliary piston to move said auxiliary piston rearwardly and compress said spring, said spring being operative upon removal of said source pressure to act through said first force transmission means and said rod to move said control element forwardly from said rearward inactive position to said forward limit position, and means for admitting fluid under service pressure into said housing to act against the rearward side of said service piston and to act through said second force transmission means and said rod to effect movement of said control element forwardly from said rearward inactive position to said forward limit position with the force applied to said control element being uniformly proportionate to the magnitude of said service pressure throughout said movement, said housing means comprising a first member defining one of said internal cylindrical surfaces and a second member defining the other of said internal cylindrical surfaces.

2. In an actuator as defined in claim 1, said first member being in the form of a generally cup-shaped member having an end portion defining one of said end walls, and said housing means comprising a third member also of generally cup-shaped form having an end portion defining the other of said end walls, and connection means between peripheral rim portions of said first and third members, said second member being disposed at least partly within said third member.

3. In an actuator as defined in claim 2, said second member being partly within said first member and partly within said third member.

4. In an actuator as defined in claim 2, said housing means further comprising a sleeve of resilient elastomeric material around said second member.

5. In an actuator as defined in claim 4, said sleeve of resilient elastomeric material having an annular rib portion projecting outwardly between said peripheral rim portions of said first and third members.

6. In an actuator as defined in claim 1, said second force transmitting means being adopted to permit tilting movement of said rod relative to the axis of said cylindrical surfaces.

7. In an actuator as defined in claim 6, a flexible boot around a rearward portion of said rod and between a control portion of said service piston and one of said walls.

8. In an actuator as defined in claim 7, said boot being so formed and supported as to extend radially outwardly from said central portion of said service piston and thence forwardly to an end connected to one of said wall.

9. In an actuator as defined in claim 7, said boot being so formed and supported as to extend forwardly a substantial distance from said control portion of said service piston and thence rearwardly a shorter distance to an end connected to one of said walls.

10. In an actuator for use in a vehicle having a braking system including a fluid pressure source valve means coupled to said source for developing a service pressure of variable magnitude and a brake assembly having a control element movable through a certain distance between a rearward inactive position and a forward limit position at which maximum braking force is applied to the vehicle, said actuator comprising housing means defining a rearward end wall, an intermediate partition wall and a forward end wall and rearward and forward coaxial internal cylindrical surfaces around rearward and forward spaces between said rearward and forward end walls and said partition wall, auxiliary and service pistons in said spaces on opposite sides of said partition wall, peripheral seal means on said pistons in slidable engagement with said internal cylindrical surfaces, an elongated rod for extending forwardly from said housing along the axis of said cylindrical surfaces and to a forward end connectable to said control element, first force transmitting means between said auxiliary piston and said rod, second force transmitting means between said service piston and said rod, a coiled compression spring having a forward end acting against the rearward side of said auxiliary piston means for admitting fluid under source pressure into said housing to act against the forward side of said auxiliary piston to move said auxiliary piston rearwardly and compress said spring, said spring being operative upon removal of said source pressure to act through said first force transmission means and said rod to move said control element forwardly from said rearward inactive position to said forward limit position, and means for admitting fluid under service pressure into said housing to act against the rearward side of said service piston and to act through said second force transmission means and said rod to effect movement of said control element forwardly from said rearward inactive position to said forward limit position with the force applied to said control element being uniformly proportionate to the magnitude of said service pressure throughout said movement, said service piston being in front of said partition wall and said auxiliary piston being behind said partition wall.

11. In an actuator as defined in claim 10, said second force transmitting means being adapted to permit tilting movement of said rod relative to the axis of said cylindrical surfaces.

12. In an actuator as defined in claim 11, a flexible boot around a rearward portion of said rod and between a control portion of said service piston and one of said walls.

13. In an actuator as defined in claim 12, said boot being so formed and supported as to extend radially outwardly from said central portion of said service piston.

14. In an actuator as defined in claim 12, said boot being so formed and supported as to extend forwardly a substantial distance from said central portion of said service piston and thence rearwardly a shorter distance to an end connector to said one of said walls.

15. In an actuator as defined in claim 12, a coiled compression spring within said housing means between said service piston and said forward end wall and in surrounding relation to said boots, said spring having a diameter progressively changing from an end to the other.

16. In an actuator as defined in claim 15, the diameter at the rearward end of said spring being swollen than that of the forward end of said spring.

17. In an actuator as defined in claim 15, the diameter at the forward end of said spring being larger than that of the rearward end of said spring.

18. In an actuator as defined in claim 10, said housing means comprising a first member defining one of said internal cylindrical surfaces and a second member defining the other of said internal cylindrical surfaces.

19. In an actuator as defined in claim 18, said first member being in the form of a generally cup-shape member having an end portion defining one of said end walls, and said housing means comprising a third member also of generally cup-shaped form having an end portion defining the other of said end walls, and connection means between peripheral rim portions of said first and third members, said second member being disposed at least partly within said third member.

20. In an actuator as defined in claim 19, said second member being partly within said first members and partly within said third members.

21. In an actuator as defined in claim 19, said housing means further comprising a sleeve of resilient elastomeric material around said second members.

22. In an actuator as defined in claim 21, said sleeve of resilient elastomeric material having an annular rib portion projecting outwardly between said peripheral rim portions of said first and third members.

* * * * *